(12) United States Patent
Gurton

(10) Patent No.: US 6,674,089 B2
(45) Date of Patent: Jan. 6, 2004

(54) OPTICAL TECHNIQUE FOR THE DETECTION OF SUSPENDED TRIP-WIRES AND CABLES

(75) Inventor: Kristan P. Gurton, Ashton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 162 days.

(21) Appl. No.: 09/817,740

(22) Filed: Mar. 26, 2001

(65) Prior Publication Data

US 2001/0045533 A1 Nov. 29, 2001

Related U.S. Application Data

(60) Provisional application No. 60/196,865, filed on Apr. 10, 2000.

(51) Int. Cl.[7] .............................................. G01N 21/86
(52) U.S. Cl. ................................................. 250/559.4
(58) Field of Search ....................... 250/559.4; 235/472, 235/467; 382/154, 141, 203, 285; 356/376

(56) References Cited

U.S. PATENT DOCUMENTS 4,902,126 A * 2/1990 Koechner .................. 356/5.08
5,594,232 A * 1/1997 Giordano ................ 235/462.43
6,064,759 A * 5/2000 Buckley et al. ............. 382/154

OTHER PUBLICATIONS

RSTA for Small Roveers in Urban Warfare, Stuart Young, Pete Budulas, Philip Emmerman, Mike Scanlon, Nassy Srour, Dave Hillis, Phil David, Pete Fisher, Steve Vinci, Art Harrison, Kris Gurton, Sam Crow and Mark Wellman.

* cited by examiner

Primary Examiner—Tu T. Nguyen
(74) Attorney, Agent, or Firm—Paul S. Clohan, Jr.; William Randolph

(57) ABSTRACT

An apparatus for detecting a trip wire includes a point source of light of a given wavelength; a mirror that reflects the point source of light, the mirror having a first frequency of oscillation about a first axis to thereby create an appearance of a continuous line, the mirror having a second frequency of oscillation about a second axis to thereby define a planar surface, the first frequency of oscillation being greater than the second frequency of oscillation; a camera offset from the point source of light such that a field of view of the camera does not intersect the planar surface, the camera receiving light reflected from the trip wire; and a computer connected to the camera, the computer including pattern recognition algorithms for analyzing the light reflected from the trip wire and thereby detecting a presence of the trip wire.

12 Claims, 4 Drawing Sheets

Wiper illumination raster scan

Perpendicular translation illumination raster scan

Bow-tie raster scan

Wiper raster scan

Perpendicular translation raster scan

US 6,674,089 B2

OPTICAL TECHNIQUE FOR THE DETECTION OF SUSPENDED TRIP-WIRES AND CABLES

CROSS-REFERENCE TO RELATED APPLICATIONS

The present application claims the benefit of priority of U.S. provisional patent application Ser. No. 60/196,865 filed on Apr. 10, 2000, which is hereby expressly incorporated by reference.

STATEMENT OF GOVERNMENT INTEREST

The invention described herein may be manufactured and used by or for the Government of the United States of America for government purposes without the payment of any royalties therefor.

BACKGROUND OF THE INVENTION

The present invention relates in general to the detection of trip-wires and in particular to the detection of trip-wires using optical techniques.

The reliable detection of trip-wires has been a problem that has plagued the military research community for some time. Military and law enforcement agencies currently do not have an effective way of detecting simple trip-wires. This problem is exacerbated during combat situations in which meticulous inspection of one's pathway is often not possible. Civilian law enforcement groups, such as the Drug Enforcement Agency (DEA), have reported an increase in so-called "booby-trapped" incidences involving their agents. It is often the case that when an illegal crop is identified, DEA personnel are placed at great risk during the secure phase of an operation in which booby-traps are searched out and disarmed.

A similar problem involves the detection and early warning of power-lines and hanging cables during certain helicopter missions. A particularly troublesome situation encountered by military pilots involves urban night missions in which the probability of a helicopter coming in contact with a power cable or wire is greatly increased.

The state of the art involving the detection of suspended wires and cables can be broken into two classifications, i.e., natural/ambient or active illumination schemes. Both methods are actually adaptations of a much broader application and consequently do not function very effectively. The natural illumination method (favored among most robotic scientists since it is the simplest to implement) involves applying various pattern recognition algorithms (PRAs) to transmitted video imagery from visible cameras mounted on a robot. The PRAs are designed to key in on and identify any "fine-line" structures that are present in the video scene. Unfortunately, this approach must overcome two fundamental problems. First, naturally illuminated 2-D video scenes do not convey the type of information necessary for PRAs to accurately distinguish between common straight edges (e.g., a sharp edge of a tabletop) and suspended wires. As a result, the false-alarm rate is often very high for all but the most simple of scenes. Second, by their very nature, trip-wires are designed to blend into their backgrounds and thus often do not exhibit the necessary contrast needed for PRAs to "key on".

Active illumination methods (sometimes termed 3-D laser imaging/Doppler) use a pulsed laser to illuminate an extended target by optically scanning out a 2-D area using a particular scan. Coincident sensors are then used to record the position and time delay in the scattered signal. A pseudo image is generated that gives rough dimensions and distance to the illuminated object. Such systems are currently deployed and undergoing evaluation on various military helicopters. These systems are both extremely complex and expensive to deploy. Furthermore, this technique is only effective in identifying targets that have reasonably large extended areas and are inefficient in identifying objects that possess small geometric cross-sections, such as hanging wires or cables.

Both active and passive techniques as outlined above are deficient in their approaches because they cue on features that are not entirely unique to the target of interest, i.e., trip-wires and/or cables.

BRIEF DESCRIPTION OF THE DRAWINGS

Throughout the Figures, reference numerals that are the same refer to the same features.

DETAILED DESCRIPTION OF THE PREFERRED EMBODIMENTS

Figure 1:
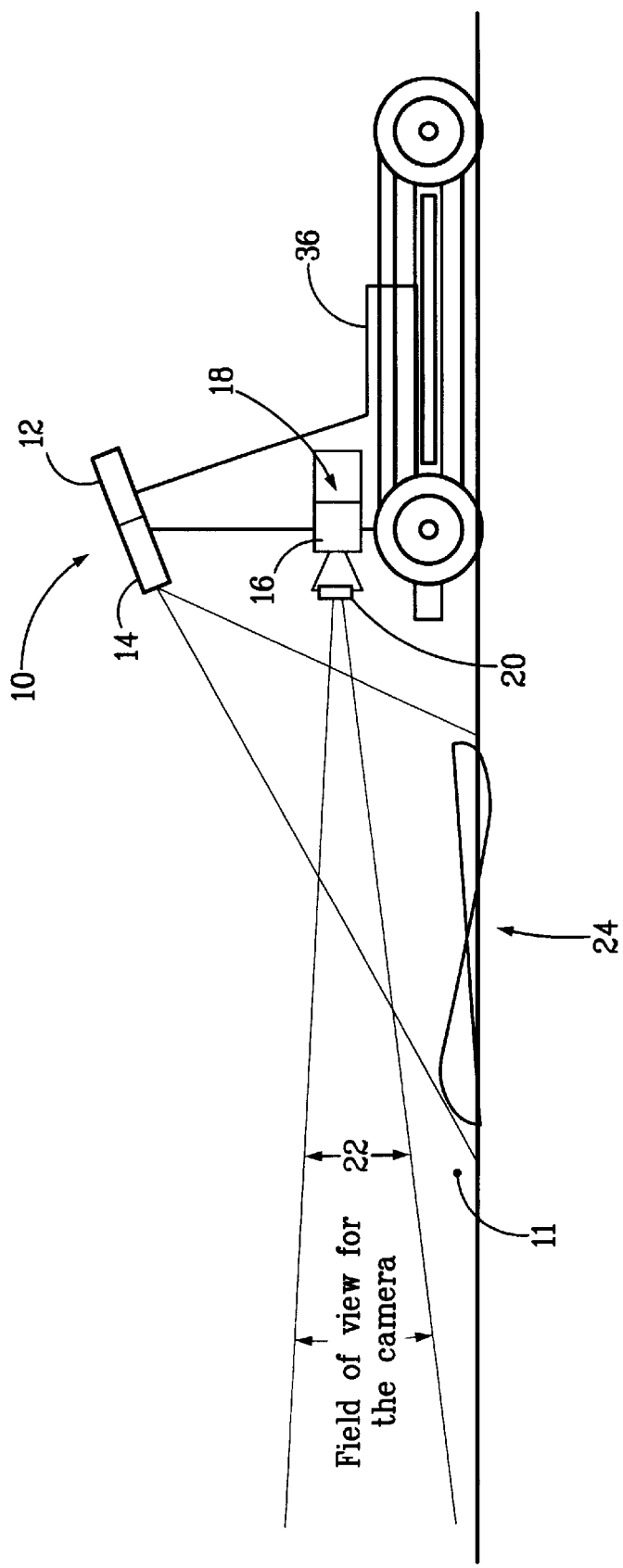
FIG. 1 is schematically shows one embodiment of the invention.

FIG. 1 is a schematically shows one embodiment of the invention. FIG. 1 shows an apparatus 10 for detecting a trip wire 11. As shown in FIG. 1, the trip wire 11 extends perpendicular to the plane of FIG. 1. The apparatus 10 includes a point source of light 12 of a given wavelength and a mirror 14 that reflects the point source of light 12. The mirror 14 has a first frequency of oscillation about a first axis to thereby create an appearance of a continuous line and a second frequency of oscillation about a second axis to thereby define a planar surface 24. The first frequency of oscillation is greater than the second frequency of oscillation.

The apparatus 10 further includes a camera 16 offset from the point source of light 12 such that the field of view 22 of the camera 16 does not intersect the planar surface 24. One possible offset configuration is shown in FIG. 1 wherein the various components of the invention are mounted on a tracked vehicle 36. The tracked vehicle 36 is exemplary only. The components of the invention could be mounted in a variety of different ways, for example, on a robot or a helicopter. With the camera 16 offset from the point source of light 12, it can best capture the resulting image for pattern recognition post-processing. This is so because the offset recording camera 16 has a field of view 22 that sees the linearly moving point reflection when a tripwire 11 is encountered, but does not see the forward illumination pattern projected on distant objects.

The camera 16 receives light reflected from the trip wire 11. A computer 18 is connected to the camera 16. The computer 18 includes known pattern recognition algorithms for analyzing the light reflected from the trip wire 11 and thereby detecting the presence of the trip wire. A narrow band pass filter 20 filters the light reflected from the trip wire 11 before it enters the camera 16. Preferably, the narrow band pass filter 20 is centered around the given wavelength of the point source of light 12. The narrow band pass filter 20 effectively blocks out any stray light that is not associated with the illumination by the point source of light 12.

Preferably, the point source of light 12 is a laser, in particular a HeNe laser with a wavelength of 0.6 micrometers. The first frequency of oscillation of the mirror 14 is preferably at least sixty hertz. The second frequency of oscillation of the mirror 14 is preferably less than one hertz. The camera 16 is preferably a video camera.

Figure 2:
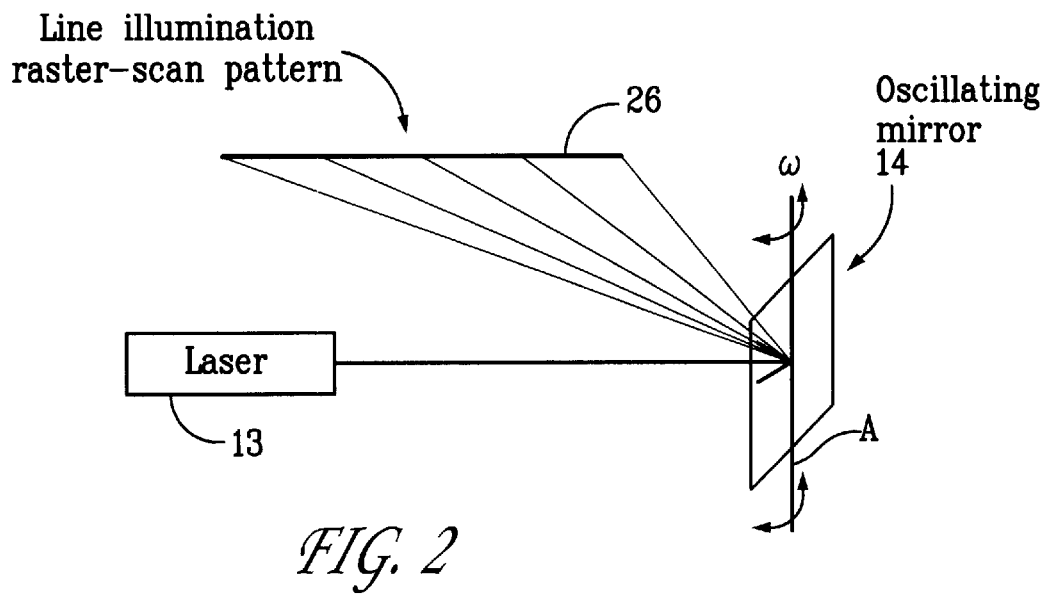
FIG. 2 schematically shows how the appearance of a continuous line is created.

FIG. 2 schematically shows how the appearance of a continuous line 26 is created. Continuous line 26 is a fine line of very bright illumination that is created by reflecting an intense point source of light, such as laser 13, off a rapidly oscillating mirror 14. The oscillatory rate, ω, about axis A, must be sufficient to produce what "appears" to be a continuous line 26 of intense illumination. Oscillatory rates of at least 60 Hz are adequate for video capture.

Figure 3A:
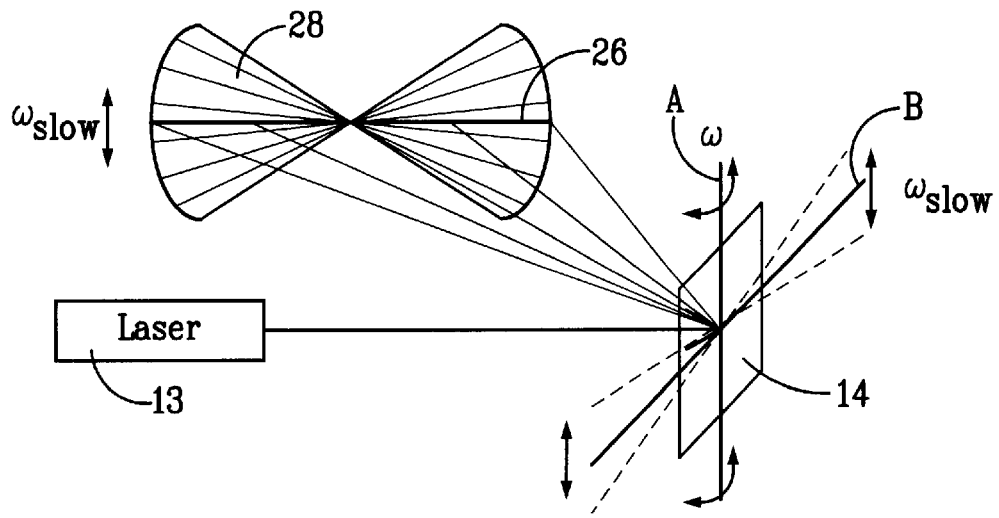
FIGS. 3A, 3B and 3C schematically show how three scan patterns are created.
Figure 3B:
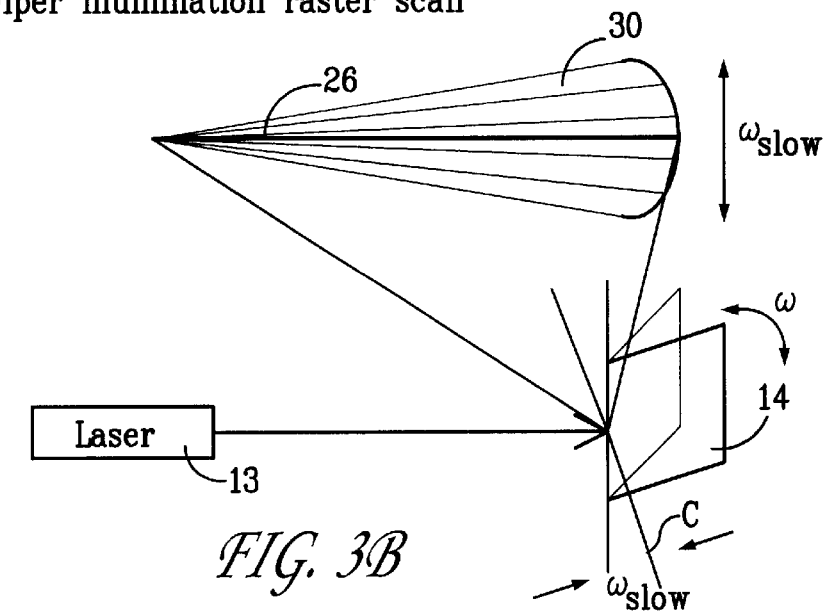
Figure 3C:
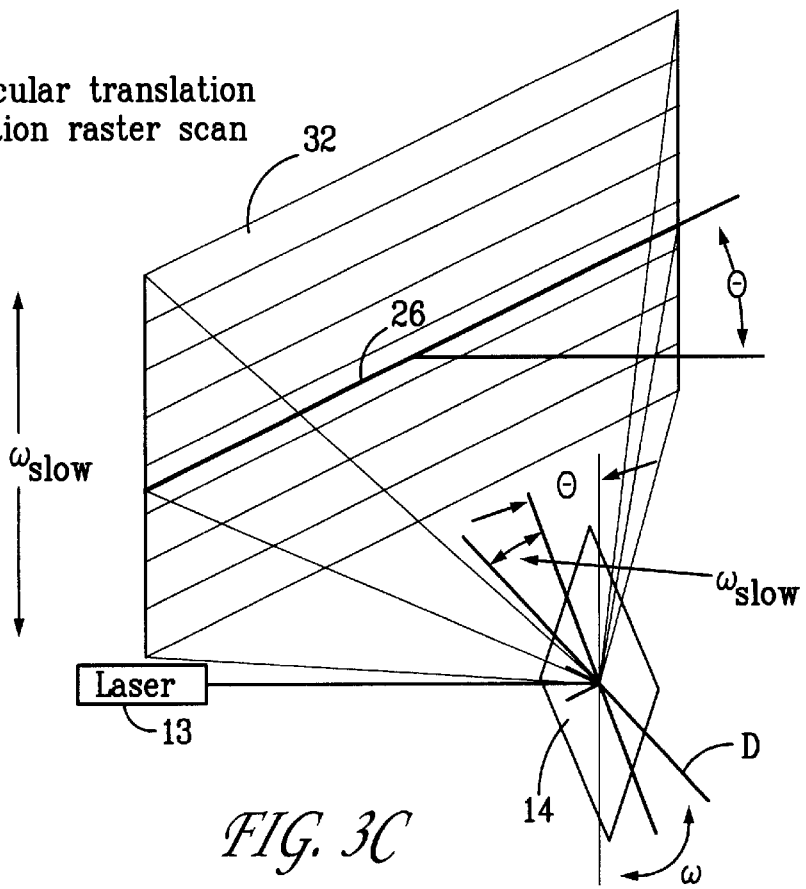

Next, the position of the appearance of the continuous line 26 is varied in a time dependent manner. FIGS. 3A, 3B and 3C schematically show how three possible scan patterns are created. FIG. 3A shows a "bow-tie" pattern, FIG. 3B shows a "wiper" pattern and FIG. 3C shows a perpendicular translation pattern. In each case, a much slower oscillatory frequency, $\omega_{slow}$, (i.e., $\omega_{slow} < 1$ Hz) is imposed about a second axis of the oscillating mirror 14. The second axis is labeled B, C and D in FIGS. 3A, 3B and 3C, respectively. The slow precession about the second axis produces an extremely bright line of illumination 26 that is projected on a planar surface.

In FIG. 3A, the line 26 appears to pivot about the its center point resulting in the creation of a substantially bow-tie shaped planar surface 28. In FIG. 3B, the line 26 appears to pivot about one of its end-points resulting in the creation of a substantially triangular shaped planar surface 30. In FIG. 3C, the line 26 appears to be skewed by an angle theta (relative to the wire being detected) in an up and down fashion resulting in the creation of a substantially rectangular planar surface 32. One type of scan may have an advantage over another, depending on the specific application, but all three are designed to produce the same effect, described below.

Figure 4A:
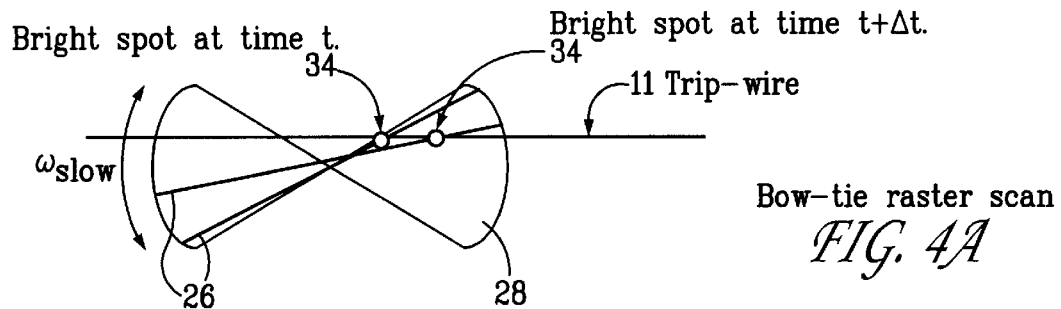
FIGS. 4A, 4B and 4C schematically show the intersection of a trip wire with three scan patterns, respectively.
Figure 4B:
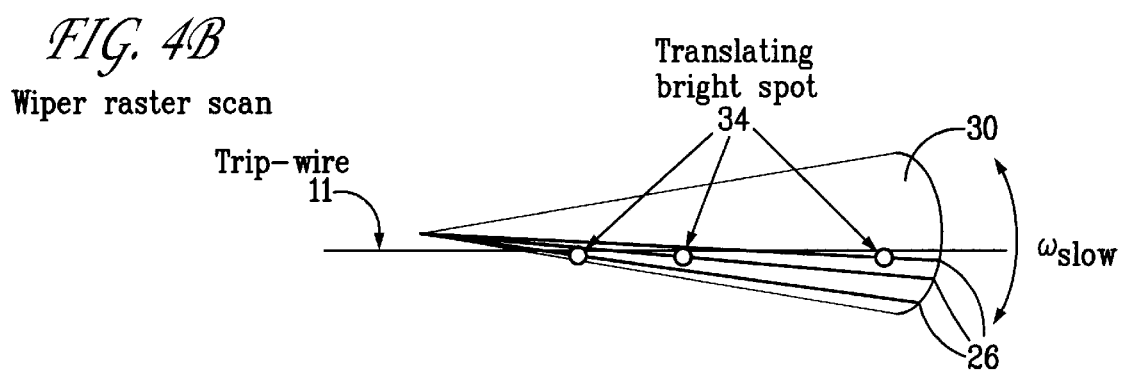
Figure 4C:
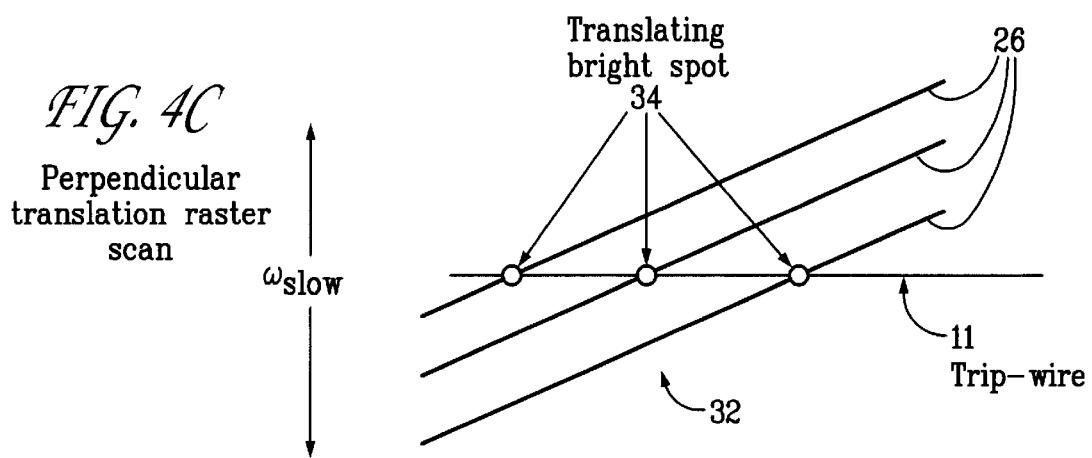

FIGS. 4A, 4B and 4C schematically show the intersection of a trip wire 11 with the three scan patterns of FIGS. 3A, 3B and 3C, respectively. When a suspended wire 11 or cable is brought into the illumination fields 28, 30, 32 of any of the three scans, a very bright "point" spot 34 results due to the scattering of light off the wire 11 at the intersection of the illumination line 26 and the wire 11 of interest. At some time At later, the point of intersection 34 will have traversed a distance along the wire 11, reached an end-point of the wire 11 and returned in the opposite direction along the same wire 11. This type of illumination results in a very distinct and unique pattern that is best described as a linearly moving point source that retraces its path in a slow, repetitive, oscillatory manner. Attempts to mimic this pattern using extended edges and geometries (i.e., table tops, chairs, metallic trim, etc.) have shown it to be quite unique to suspended wires and cables only.

While the invention has been described with reference to certain preferred embodiments, numerous changes, alterations and modifications to the described embodiments are possible without departing from the spirit and scope of the invention, as defined in the appended claims and equivalents thereof.

What is claimed is:

1. An apparatus for detecting a trip wire, comprising:
   a point source of light of a given wavelength;
   a mirror that reflects the point source of light, the mirror having a first frequency of oscillation about a first axis to thereby create an appearance of a continuous line, the mirror having a second frequency of oscillation about a second axis to thereby define a planar surface, the first frequency of oscillation being greater than the second frequency of oscillation;
   a camera offset from the point source of light such that a field of view of the camera does not intersect the planar surface, the camera receiving light reflected from the trip wire; and
   a computer connected to the camera, the computer including pattern recognition algorithms for analyzing the light reflected from the trip wire and thereby detecting a presence of the trip wire.

2. The apparatus of claim 1 wherein the point source of light comprises a laser.

3. The apparatus of claim 2 wherein the laser comprises a HeNe laser.

4. The apparatus of claim 1 wherein the given wavelength is about 0.6 micrometers.

5. The apparatus of claim 1 wherein the first frequency of oscillation of the mirror is at least sixty hertz.

6. The apparatus of claim 1 wherein the second frequency of oscillation of the mirror is less than one hertz.

7. The apparatus of claim 1 further comprising a narrow band pass filter through which the light reflected from the trip wire passes before entering the camera.

8. The apparatus of claim 7 wherein the narrow band pass filter is centered around the given wavelength.

9. The apparatus of claim 1 wherein the planar surface comprises a substantially bow-tie shape.

10. The apparatus of claim 1 wherein the planar surface comprises a substantially triangular shape.

11. The apparatus of claim 1 wherein the planar surface comprises a substantially rectangular shape.

12. The apparatus of claim 1 wherein the camera comprises a video camera.

* * * * *